(12) United States Patent
Bulin et al.

(10) Patent No.: US 8,448,420 B2
(45) Date of Patent: May 28, 2013

(54) AIRCRAFT NACELLE THAT INCORPORATES A DEVICE FOR REVERSING THRUST

(75) Inventors: Guillaume Bulin, Blagnac (FR); Patrick Oberle, Verdun sur Garonne (FR)

(73) Assignee: Airbus Operations SAS, Toulouse (FR)

( * ) Notice: Subject to any disclaimer, the term of this patent is extended or adjusted under 35 U.S.C. 154(b) by 956 days.

(21) Appl. No.: 12/525,578

(22) PCT Filed: Jan. 23, 2008

(86) PCT No.: PCT/FR2008/050102
§ 371 (c)(1),
(2), (4) Date: Aug. 3, 2009

(87) PCT Pub. No.: WO2008/107605
PCT Pub. Date: Sep. 12, 2008

(65) Prior Publication Data
US 2010/0031630 A1      Feb. 11, 2010

(30) Foreign Application Priority Data

Feb. 1, 2007  (FR) ...................................... 07 53011

(51) Int. Cl.
*F02K 1/72* (2006.01)

(52) U.S. Cl.
USPC ...................................................... 60/226.2

(58) Field of Classification Search
USPC ................. 60/226.2, 226.3, 230; 239/265.25, 239/265.27, 265.29, 265.19, 263.31; 244/110 B
See application file for complete search history.

(56) References Cited

U.S. PATENT DOCUMENTS

| | | | |
|---|---|---|---|
| 3,598,320 A | * | 8/1971 | Babin et al. .............. 239/265.25 |
| 5,930,991 A | | 8/1999 | Fournier et al. |

FOREIGN PATENT DOCUMENTS

| | | |
|---|---|---|
| EP | 0 574 730 | 12/1993 |
| FR | 1.596.120 | 6/1970 |
| GB | 808 608 | 2/1959 |
| WO | 96/38661 | 12/1996 |

OTHER PUBLICATIONS

International Search Report dated Nov. 13, 2008, from corresponding PCT application.

* cited by examiner

*Primary Examiner* — Phutthiwat Wongwian
*Assistant Examiner* — Vikansha Dwivedi
(74) *Attorney, Agent, or Firm* — Young & Thompson

(57) ABSTRACT

An aircraft nacelle in which a power plant is arranged delimits a duct for a flow which assists the thrust. The nacelle includes a device for reducing, canceling, or reversing the thrust that includes at least one flap that can have an active position in which it deflects—in the direction of a radial opening—at least a portion of the flow and an at-rest position in which the flap does not interfere with the flow, whereby the wall of the nacelle delimiting the duct includes at least one moving part that can occupy a first position in which it is interposed between the flow to be deflected and the flap and another position in which it releases the flap so as to allow the flap to change position and to move from the at-rest position to the active position.

21 Claims, 6 Drawing Sheets

AIRCRAFT NACELLE THAT INCORPORATES A DEVICE FOR REVERSING THRUST

BACKGROUND OF THE INVENTION

1. Field of the Invention

Figure 1A:
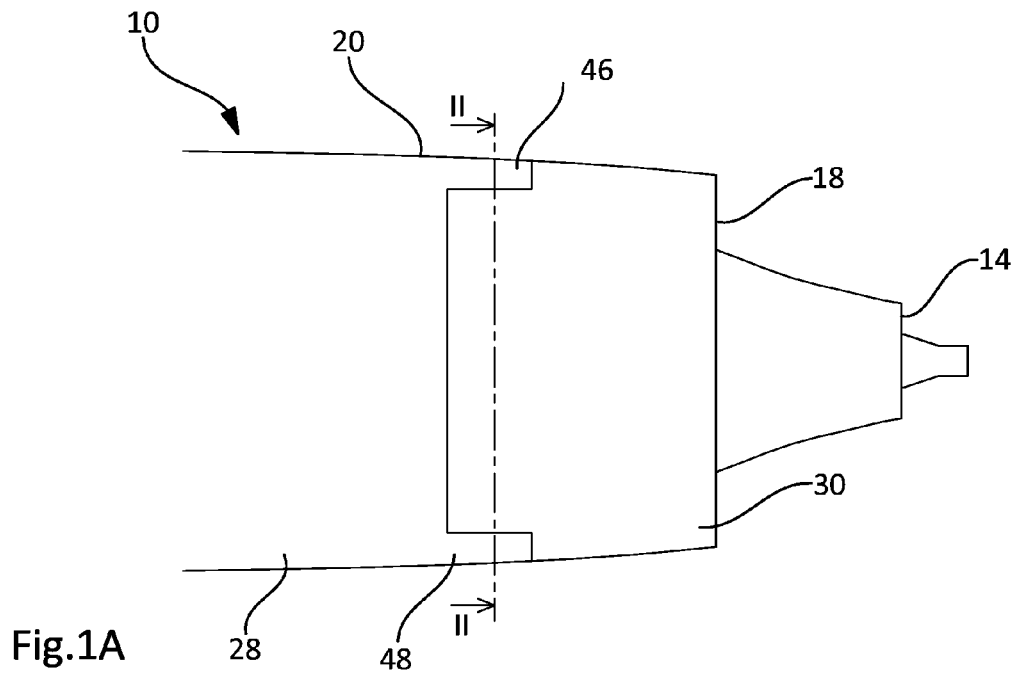

This invention relates to an aircraft nacelle and more particularly to a device that is provided on an aircraft nacelle to reduce, cancel or reverse thrust that is produced by a propulsion unit.

2. Description of the Related Art

An aircraft propulsion unit comprises an engine with, on the one hand, a fan that comprises a rotor that is equipped with blades and a stator that is equipped with paddles, and, on the other hand, a primary duct in which compressor stages, a combustion chamber, and turbine stages are arranged in the direction of the air flow. The engine is arranged in a nacelle that comprises an air intake upstream from the fan and a secondary duct downstream from the stator of the fan.

In general, the nacelle consists of two junctions that are arranged in the secondary duct and along angular positions that are respectively greater than 12 o'clock and less than 6 o'clock. These two junctions constitute aerodynamic fairings with structural elements and with propulsion unit systems that connect the primary duct to the rest of the nacelle. When the power plant is provided under the wing, the mast that attaches the propulsion unit to the wing is partially arranged in the upper junction to connect the primary duct to the rest of the propulsion unit.

So as to reduce the noise pollution, certain portions of the surfaces of the secondary duct comprise coatings for the acoustic surface treatment.

A propulsion unit generally comprises a device for reversing thrust that makes it possible to deflect at least a portion of the flow so as to reduce, cancel or reverse the thrust that is produced by said propulsion unit using one or more moving physical obstacles.

According to an embodiment that is described in particular in the document EP-1515035, the nacelle comprises at least one moving part that can move translationally toward the rear of the nacelle so as to prepare, between the stationary parts and said at least one moving part, at least one radial opening toward which at least a portion of the flow that flows into the secondary duct can be deflected. According to this embodiment, the secondary duct has suitable shapes, in particular bent so that the moving part comes into contact with the inside wall of the secondary duct so as to seal said duct when the moving part is moved backward in translation. Even if this approach simplifies the design of the device for reversing thrust, it imposes an additional constraint on the secondary duct, in particular a particular shape that tends to reduce the performance levels of the propulsion unit.

According to another so-called variant with a pivoting door, the nacelle comprises a moving part that is called a door that can pivot relative to its axis so as to generate a radial opening after pivoting, whereby said door comprises a part that projects into the secondary duct so as to form an obstacle that can deflect at least a portion of the flow that flows into said secondary duct in the direction of the radial opening.

According to another so-called cascade variant, the nacelle comprises at least one moving part that can move toward the rear of the nacelle in translation so as to provide—between the stationary parts and said at least one moving part—at least one radial opening, as well as flaps that are provided in the secondary duct, articulated relative to the moving part, able to occupy a first deployed position in which they at least partially stop the secondary duct so as to deflect the air flow in the direction of the radial opening and a second retracted position, flattened against the surface of the nacelle. Connecting rods are generally provided for maneuvering the flaps, whereby one of the ends of the connecting rods is connected to the flap and the other to the power plant.

The pivoting-door-type or cascade-type thrust reversers are not satisfactory for the following reasons.

These configurations limit the inside surface of the nacelle that can comprise a coating for the acoustic treatment. Actually, the connecting zones between the stationary parts and the moving parts, the zones at which the joints of the pivoting elements (doors or flaps) are provided, cannot comprise a coating for the acoustic treatment. In the case of a cascade reverser, the untreated surfaces can represent on the order of 20% of the inside surface area of the nacelle.

These configurations also produce aerodynamic losses in flows that flow into the secondary duct due to the numerous connections between the stationary parts and the moving parts and numerous obstacles that are present in the flow, such as the connecting rods for the flaps of the cascade reversers.

These configurations also produce adjustment difficulties between the stationary parts and the moving parts, in particular those that are used to deflect at least a portion of the flow because the deformation of said moving parts varies based on their position.

Finally, the presence of numerous pivoting elements, in particular in the case of a cascade reverser, causes the mass of the nacelle to increase because of the multitude of articulation and control systems and reinforcement of the structure of the nacelle so as to ensure the absorption of forces disseminated over the entire periphery of said nacelle and in particular over the moving part of the nacelle (rear frame, force expulsion, etc.).

The patent application WO 2007/003749 proposes a solution that consists in providing doors in the rear part of the nacelle. This solution allows a better acoustical treatment of the inside surfaces but leads to increasing the thickness of the nacelle in the rear part.

SUMMARY OF THE INVENTION

Also, the purpose of this invention is to eliminate the drawbacks of the prior art by proposing an aircraft nacelle that incorporates a device for reversing thrust that is simple in design, able to optimize the acoustic treatment, to not interfere with aerodynamic performances and to limit the increase of the on-board weight.

For this purpose, the invention has as its object an aircraft nacelle in which a power plant is arranged and which delimits a duct in which a flow that is able to assist the thrust is able to flow, whereby said nacelle comprises a device for reducing, canceling, or reversing the thrust that comprises at least one flap that can occupy at least one so-called active position in which it deflects—in the direction of a radial opening—at least a portion of the flow that is able to assist the thrust and another so-called at-rest position in which said flap does not interfere with the flow that is able to assist the thrust, whereby the wall of the nacelle delimiting the duct into which the flow to be deflected flows comprises at least one moving part that can occupy two positions, a first position in which it is interposed between the flow to be deflected and the flap and another position in which it releases the flap so as to allow said flap to change position and to move from the at-rest position to the active position, characterized in that each flap comprises articulation means with a first pivoting axis arranged at a first end called the upper end of the flap and in the upper part of the nacelle and a second pivoting axis arranged at a second end called the lower end of the flap and in the lower part of the nacelle, whereby said pivoting axes are essentially parallel to the vertical median axis of the nacelle.

BRIEF DESCRIPTION OF THE DRAWING FIGURES

Figure 1B:
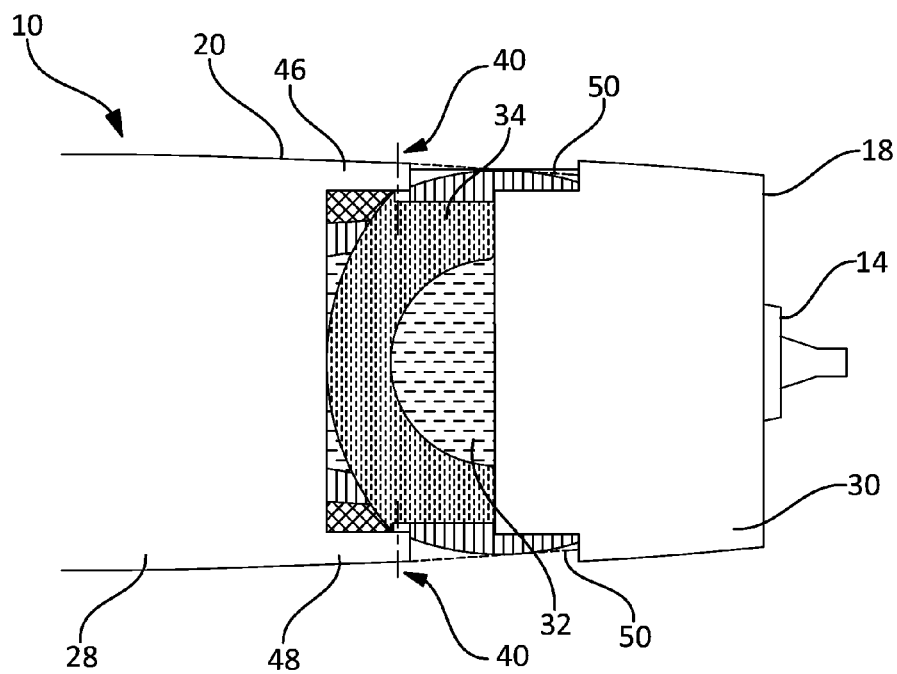
Figure 1C:
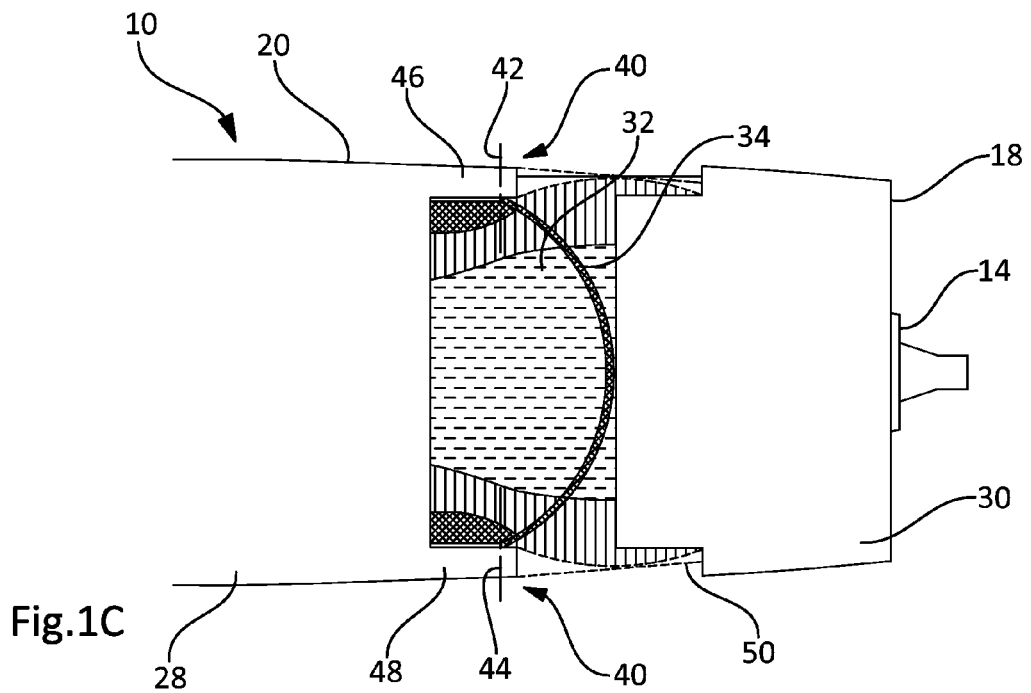

Other characteristics and advantages will emerge from the following description of the invention, a description that is provided only by way of example, taking into account the accompanying drawings, in which:

FIGS. 1A to 1C are lateral views that diagrammatically illustrate the thrust reversal device according to a variant of the invention, respectively at rest, during deployment, and in the active state.

Figure 2:
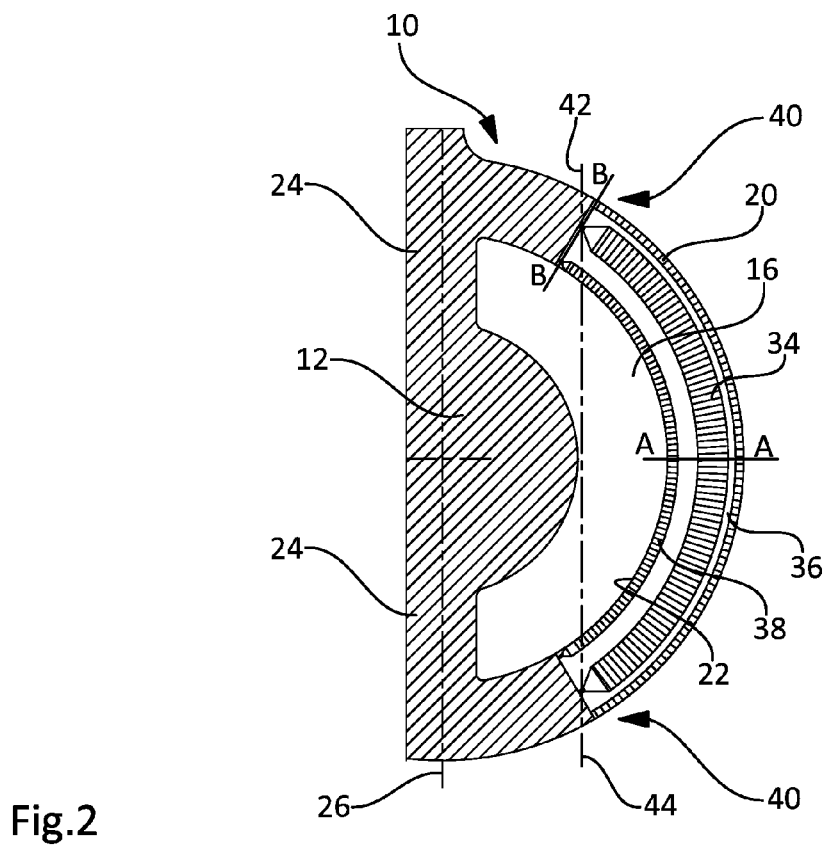
Figure 3A:
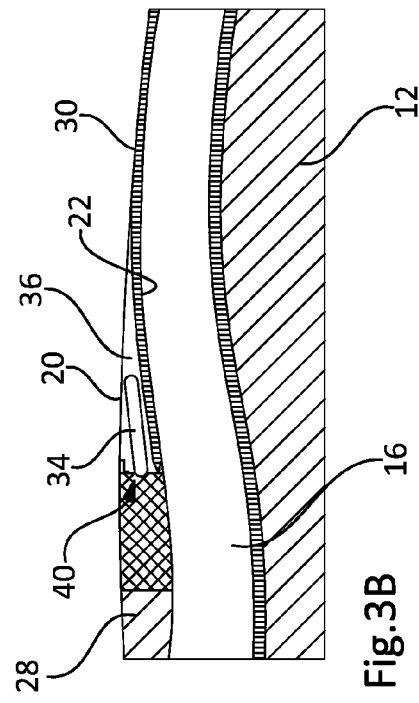
Figure 4A:
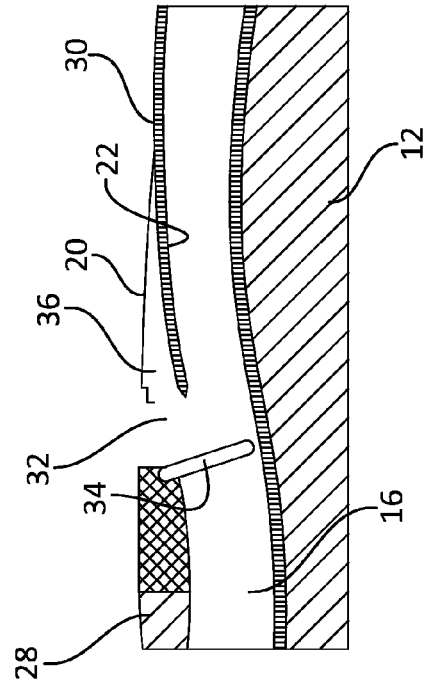
Figure 3B:
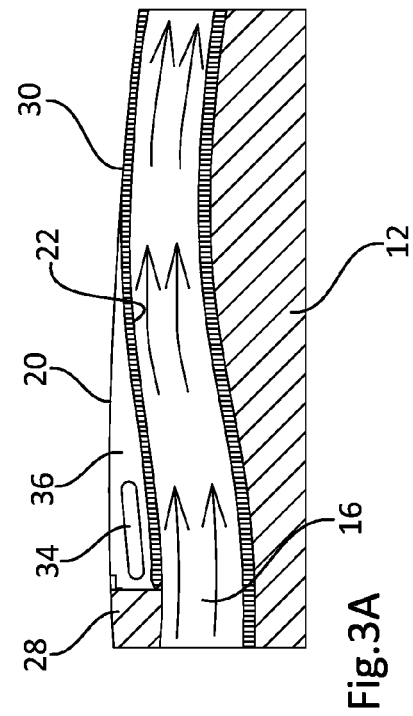
Figure 4B:
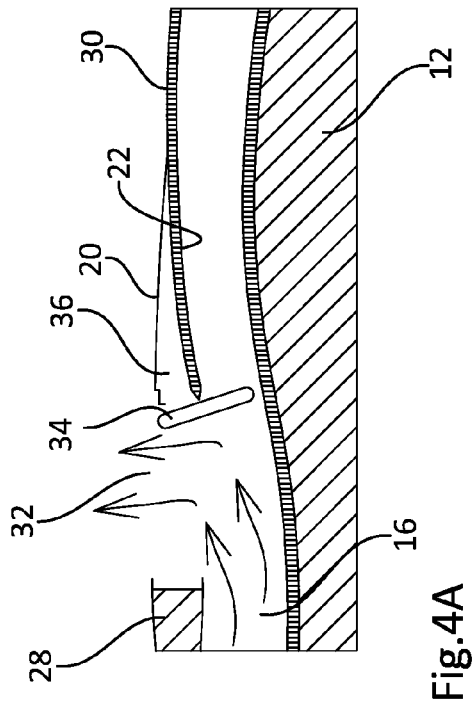
Figure 5:
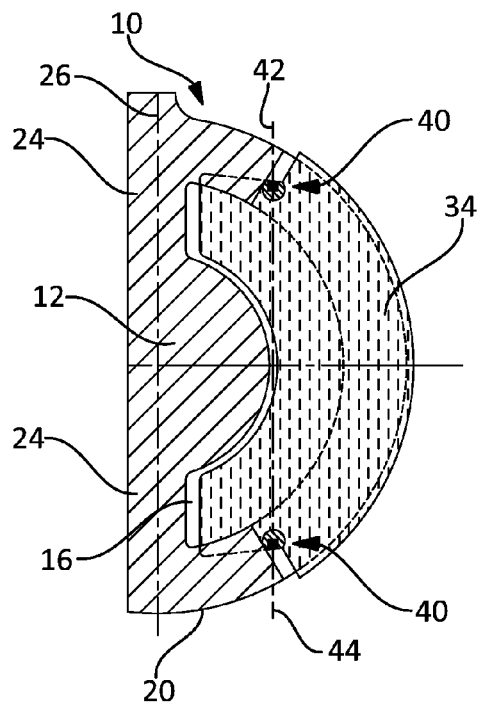
Figure 6:
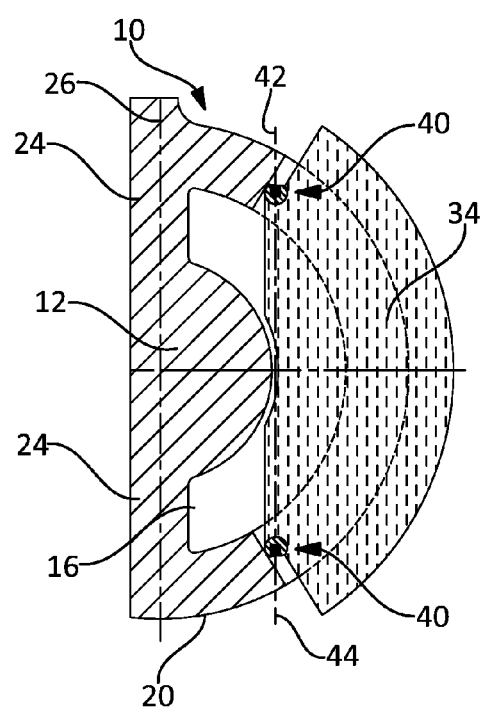
Figure 7:
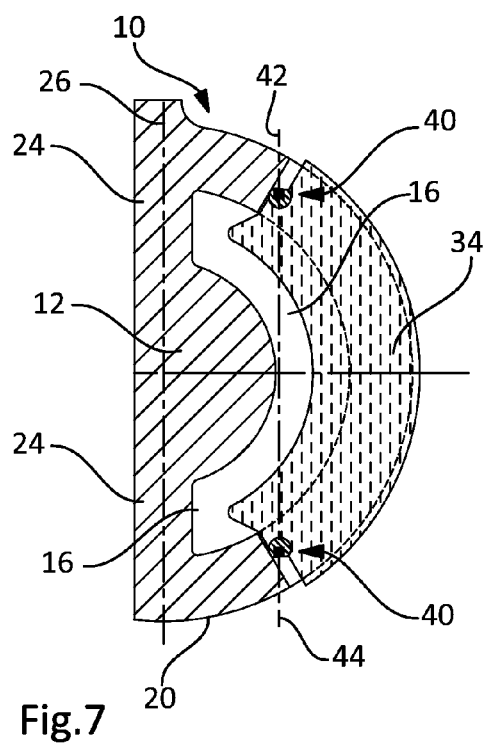
Figure 8A:
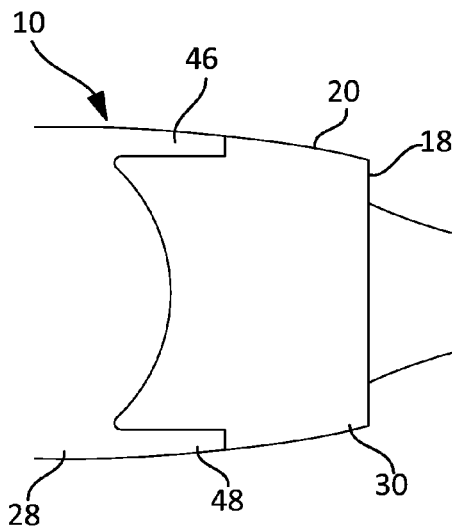
Figure 8B:
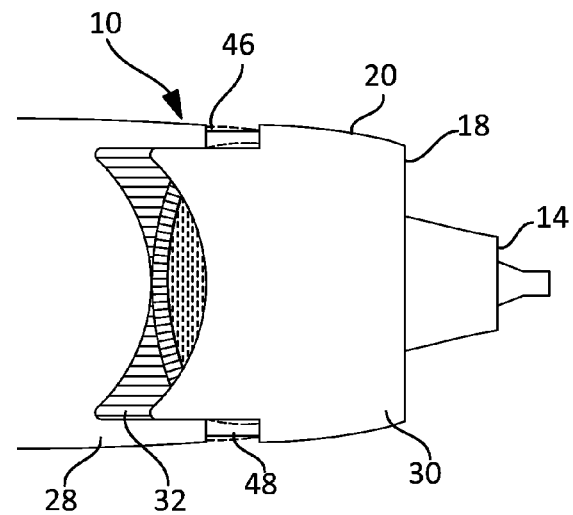
Figure 8C:
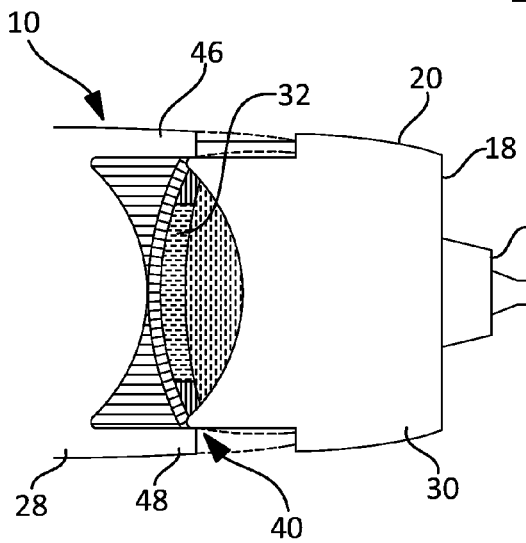
Figure 8D:
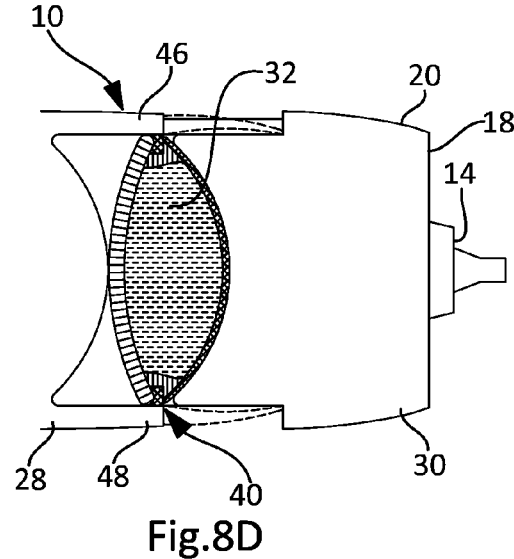
Figures 9A, 9B, 9C:
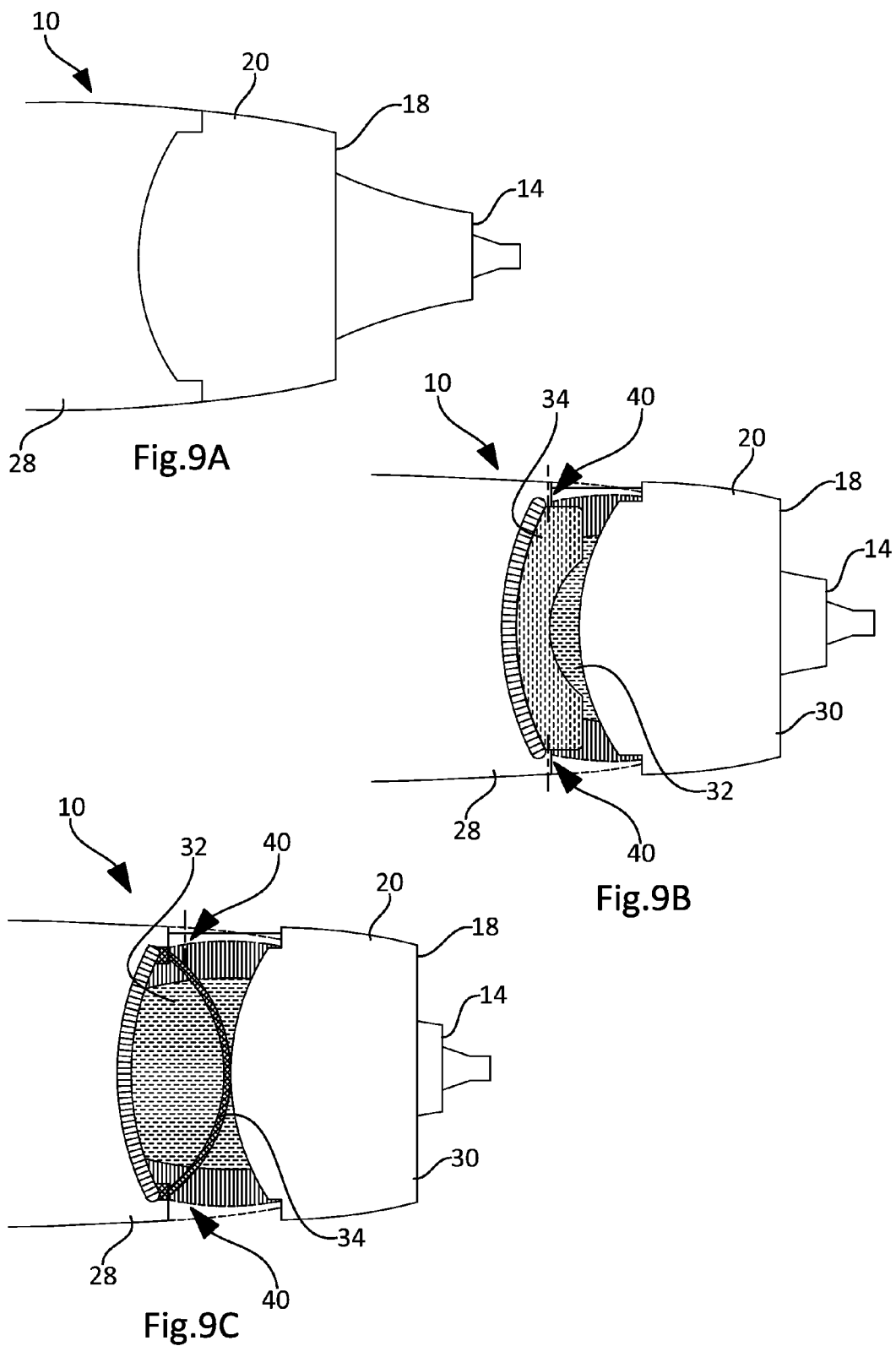

FIG. 2 is a transversal cutaway along the line II-II of FIG. 1A that diagrammatically illustrates a nacelle according to the invention, FIGS. 3A and 4A are sections along the line A-A of FIG. 2 illustrating the thrust reversal device respectively at rest and in the active state, FIGS. 3B and 4B are sections along the line B-B of FIG. 2 illustrating the thrust reversal device respectively at rest and in the active state, FIGS. 5 to 7 are transversal sections of the nacelle illustrating different variants of the thrust reversal device, FIGS. 8A to 8D are lateral views that diagrammatically illustrate another variant of the thrust reversal device according to the invention at different stages of its deployment, and FIGS. 9A to 9C are lateral views that digrammatically illustrate another variant of the thrust reversal device according to the invention at different stages of its deployment.

DETAILED DESCRIPTION OF THE INVENTION

In the different figures, an aircraft nacelle is shown at 10 in which a power plant, shown diagrammatically at 12, can be arranged.

At the front, the nacelle 10 comprises an air intake that is divided into a primary duct that moves through the power plant and empties out via a primary exhaust 14 at the rear of the nacelle and into a secondary duct 16 that is provided at the rear of a fan that empties out via a secondary exhaust 18. Thus, the thrust of the propulsion unit that is formed by the nacelle and the power plant originates in particular from the ejection of fluid flow leaving the primary and secondary exhausts 14 and 18.

The nacelle comprises a first wall whose outside surface 20 is in contact with the fluid flows that flow outside of the nacelle and a second wall whose inside surface 22 delimits the secondary duct 16.

Two junctions 24 are generally arranged in the secondary duct 16 and form partitions arranged in a vertical plane, in angular positions respectively greater than 12 o'clock and less than 6 o'clock, in said duct 16. Thus, the nacelle comprises a reinforced structure in the zone of the vertical median plane formed by the axis 26. This reinforced structure is also used to serve as an anchoring point to a mast that connects the nacelle to the aircraft, and more particularly the nacelle to the wing of the aircraft.

All of these elements are not presented in more detail because they are known to one skilled in the art, and they can assume different shapes based on the configurations.

The nacelle comprises at least one device that makes it possible to reduce, to cancel or to reverse the thrust that is produced by the propulsion unit. For this purpose, the nacelle 10 comprises at least one stationary part 28 and at least one moving part 30 that can occupy a first position in which the stationary parts 28 and the moving parts 30 are contiguous as illustrated in FIG. 1A and a second position in which a radial opening 32 is made between the stationary parts 28 and the moving parts 30, as illustrated in FIGS. 1B and 1C.

According to one embodiment, the moving part 30 is arranged behind the nacelle and can move translationally in the longitudinal direction of the nacelle so as to provide a radial opening 32 after translational motion. Connecting means and actuators are provided to ensure, on the one hand, the connection between the stationary and moving parts, and, on the other hand, the translational motion of the moving part relative to the stationary part. Advantageously, these connecting means and these actuators are arranged approximately at 12 o'clock and at 6 o'clock. This configuration makes it possible to facilitate the absorption of stresses to the extent that the actuators and the connecting means are provided at the junctions 24 that correspond to the reinforced zones of the structure of the nacelle, which makes it possible to avoid reinforcing the nacelle outside of these zones and not increasing the on-board weight.

These connecting means and these actuators are not presented in more detail because they are within the grasp of one skilled in the art.

In these figures, only one-half of the nacelle is shown, whereby the latter is approximately symmetrical along the vertical median plane that contains the axis 26.

According to the variants, the nacelle can comprise a single stationary part toward the front and a single moving part toward the rear, whereby the opening is provided over the entire periphery of the nacelle. According to another variant, the nacelle comprises a single stationary part and two moving parts, approximately symmetrical along the vertical median plane, kinematically linked or independent, the translational motion of one being independent from the other.

According to other variants, more than two moving parts could be considered. However, these variants would lead to complicating the nacelle and making it heavier, whereby the variant with two moving parties constitutes a good compromise.

To simplify the description, the latter is made with regard to one-half of the nacelle that comprises a moving part.

Different shapes can be considered to delimit the stationary part and the moving part. Thus, said stationary part and said moving part have complementary shapes so as to provide continuity at the outside surface 20 and the inside surface 22 of the nacelle.

The invention is not limited to the kinematics described by the figures, namely a translational motion to obtain a radial opening 32 so as to have the secondary duct communicate with the outside of the nacelle. Other kinematics could be considered.

The device for reducing, canceling, or reversing the thrust comprises at least one flap 34 that can occupy at least one so-called active position in which in the direction of the radial opening 32, it deflects at least a portion of the flow that can assist the thrust and another so-called at-rest position in which it does not interfere with the flow that can assist the thrust. In addition, means for orienting the deflected flow can be provided so as to orient the flow that is deflected toward the front of the nacelle, more or less radially or toward the rear of the nacelle. This orientation can originate from the position of the flap 34 or accompanying means such as, for example, the ejection of an air flow on the outside surface 20 of the nacelle upstream or downstream from the radial opening 32 so as to orient the flow respectively toward the front or toward the rear of the nacelle or the integration of cascades used in the prior art. These means of orientation are not presented in more detail because they can assume different configurations according to the variants.

Based on the orientation of the deflected flow and the quantity of deflected flow, a reduction, a cancellation or a reversal of the thrust is achieved, whereby the resulting thrust/deflected flow along the longitudinal axis of the nacelle is respectively either oriented toward the rear or zero or is oriented toward the front.

Below, thrust reversal is defined as either a reduction, or a cancellation or a reversal of the thrust.

To simplify the description, the invention is described with regard to a moving part that delimits a radial opening that is equipped with a flap. However, the nacelle can comprise several flaps, one for each radial opening.

According to the variants, as illustrated in FIGS. 5, 6, and 7, the flap 34 can have shapes that are more or less complementary to the duct into which the flow to be deflected flows based in particular on the fraction of the flow that is to be deflected. As illustrated in FIG. 6, the flap could be projecting toward the outside of the nacelle to increase its guiding capacity.

According to the invention, the wall that delimits the duct into which the flow to be deflected flows comprises at least one moving part that can occupy two positions, a first position into which it is interposed between the flow to be deflected and the flap 34 and another position into which it releases the flap so as to allow the flap to change position and to move from the at-rest position to the active position.

This configuration makes it possible to separate the functions, namely the one that consists in deflecting at least a portion of the flow provided by the flap and the one whose purpose is to channel the flow when the thrust reversal device is not activated, ensured by the moving part that covers the flap.

Preferably, the moving part that makes it possible to release or to cover the flap corresponds to the moving part 30 of the nacelle. Thus, a recess 36 is provided in the moving part between the wall that corresponds to the outside surface 20 and the wall that corresponds to the inside surface 22, whereby said recess 36 empties out at the field of the moving part 30 that can be in contact with the stationary part and that has dimensions and shapes that are suitable for making it possible to house the flap 34. Thus, when the flap 34 is in the at-rest position as illustrated in FIGS. 2, 3A and 3B, it is arranged in the recess 36 and covered by the wall that corresponds to the inside surface 22 that isolates it from the flow to be deflected. In the active position, the moving part 30, after translational motion toward the rear, then releases the flap that can then pivot as illustrated in FIG. 1C so as to deflect at least a portion of the flow that can assist the thrust.

However, the invention is not limited to this embodiment. Thus, a moving part can be provided to ensure the creation of a radial opening and another moving part to conceal the flap in the at-rest position. However, this solution would lead to complicating the nacelle and to increasing the on-board weight.

According to the invention, the inside surface 22, in particular the portion that covers the flap, can comprise a coating 38 for the acoustic treatment that makes it possible to increase the area of the surfaces treated relative to the nacelles of the prior art and contributes to reducing the noise pollution emitted by the aircraft. Furthermore, according to the invention, it is possible to obtain a covering for continuous acoustic treatment that is not interrupted by joints or other parts, which makes it possible to increase significantly the effectiveness of said covering.

Whereby the moving part 30 of the nacelle is not subjected to the same stresses as the flap, but to stresses that are essentially identical to those of the stationary part 28, a satisfactory adjustment is obtained between the stationary part and the moving part.

Furthermore, none of the elements of the thrust reversal device when the latter is at rest interferes with the flow that can assist the thrust. According to the invention, a satisfactory continuity of the surfaces that delimit the secondary duct is obtained, in particular between the stationary part and the moving part, and the number of joints between the stationary part and the moving part is limited. These characteristics contribute to optimizing the aerodynamic performance of the nacelle.

Finally, according to another advantage, the shapes and dimensions of the duct can be characterized only by taking into account desired aerodynamic characteristics without taking into account the thrust reversal function, which makes it possible to simplify the design of the nacelle, a compromise that is not necessary between the aerodynamic characteristics and the thrust reversal function.

The flap 34 comprises articulation means 40 that ensure the connection of said flap with the nacelle and more particularly the stationary part 28.

According to a characteristic of the invention, these articulation means 40 are arranged so as to connect the flap 34 close to the junctions 24 that correspond to the reinforced zones of the structure of the nacelle that makes it possible to avoid reinforcing the nacelle outside of these zones and to not increase the on-board weight.

According to one embodiment, the articulation means 40 comprise a first pivoting axis 42 that is arranged at a first end called the upper end of the flap 34 and in the upper part of the nacelle and a second pivoting axis 44 that is arranged at a second end called the lower end of the flap 34 and in the lower part of the nacelle. In this case, the flap 34 is curved, as illustrated in FIGS. 1C, 2, 8D and 9C, so as to be able to be housed in the recess 36 that is made in the moving part 30.

Preferably, the pivoting axes 42 and 44 are approximately parallel to the vertical median axis 26 and are advantageously aligned so as to form only a single pivoting axis.

The pivoting axis or the pivoting axes 42 and 44 are preferably positioned very close to the center of aerodynamic thrust of the flap so as to limit the torsion forces in the entire structure.

According to one embodiment, the stationary part 28 comprises an extension 46 toward the rear of the upper part and an extension 48 toward the rear in the lower part, approximately symmetrical relative to the vertical median axis 26, whereby these extensions 46 and 48 support the pivoting axes 42 and 44. In addition, the moving part(s) comprise(s) scalloped shapes in the upper and lower parts whose shapes work with those of the extensions of the stationary part.

If appropriate, the control system that makes it possible to ensure the pivoting movement of the flap or flaps 34 can be independent of the control system that makes possible the movement of the moving part(s) 30.

According to another embodiment, the pivoting of the flap(s) 34 and the movement of the moving part(s) can be ensured by a single control system. Thus, by way of example, a set of hydraulic jacks or screw cylinders can be integrated on the inside or close to the upper and lower junctions 24 of the nacelle and, by means of force expulsion, can control the position of the moving part(s) 30 and the position of the flap(s) 34. This solution makes it possible to limit the on-board weight.

According to another variant, it is possible to provide a first control system whose purpose is to monitor the translational motion of a moving part and the pivoting of the corresponding flap that is arranged at a first side of the nacelle and a second control system whose purpose is to monitor the transitional motion of a moving part and the pivoting of the corresponding flap arranged at a second side of the nacelle. Thus, the control of the two moving groups is segregated so as to limit the risks of inadvertent deployment during flight.

On the aerodynamic plane, the dimensions of the flap and the shapes of the cut-outs that separate the stationary part from the moving part are determined so that the output section of the secondary flow (flowing into the secondary duct) is essentially constant so as not to vary beyond a certain threshold on the order of +/−20% to avoid producing the phenomenon of surging at the fan.

Thus, as illustrated in FIGS. 8A to 8D, the edge of the moving part 30 that can be in contact with the stationary part can comprise a concave shape that works with that of the flap 34 when the latter is in active position.

According to this configuration, the flap can begin to pivot before the moving part 30 is at the end of its travel, and the exhaust section of the secondary flow varies within a range that does not exceed a certain threshold on the order of +/−20% during the deployment of the flap.

According to another variant that is illustrated in FIGS. 9A to 9C, the edge of the moving part 30 that can be in contact with the stationary part can comprise a convex shape.

According to another characteristic, the thrust reversal device of the invention can be combined with another thrust device such as, for example, an aerodynamic inductor that is positioned upstream from the radial opening of the nacelle.

According to another characteristic of the invention, deflectors 50 can be added so as to provide a certain aerodynamic continuity between the different parts of the nacelle and in particular between the stationary part and the moving parts when the latter are moved into translation toward the rear.

According to another characteristic of the invention, it is possible to obtain a variation of the exhaust section of the secondary flow by moving in translation the moving parts 30 that are provided at the rear of the nacelle because of the difference of conicity between the outside part and the inside part of the nacelle.

Thus, the moving parts 30 can provide several functions, namely to create a radial opening, to house the thrust reversal flap, and to vary the exhaust section of the secondary flow. This contributes to reducing the on-board weight because it is not necessary to provide a device that is specific to each function.

The operation of the thrust reversal device is now described with regard to the different figures.

When the thrust reversal device is at rest, the stationary part 28 and the moving part(s) 30 are contiguous, as illustrated in FIGS. 1A, 3A, 3B, 8A and 9B. The internal and external aerodynamic lines of the nacelle are thus continuous, which contributes to obtaining optimized aerodynamic characteristics. Furthermore, no element projects into the secondary duct, contrary to the prior art.

During the start-up of the thrust reversal device, the moving part(s) 30 move in translation toward the rear so as to provide a radial opening 32, one for each moving part, as illustrated in FIGS. 1B, 8B and 9B.

According to the variants, the flap(s) 34 can begin to pivot before the corresponding moving parts have reached the end of their travel, as illustrated in FIG. 8C.

At the end of the deployment of the flap(s), the latter are arranged so as to project into the secondary duct in order to deflect at least a portion of the secondary flow, as illustrated in FIGS. 1C, 4A, 4B, 8D, and 9C.

To return to the at-rest state, the preceding stages are executed in reverse order.

The invention claimed is:

1. An aircraft nacelle in which a power plant is arranged, comprising:
a duct (16) in which a flow that is able to assist thrust is able to flow;
at least one stationary part (28);
at least one moving part (30) that can occupy a first position in which the at least one stationary part (28) and the at least one moving part (30) are contiguous, and the at least one moving part (3) is configured to move translationally in a longitudinal direction so as to provide a radial opening (32) after translational motion;
a device for reducing, canceling, or reversing the thrust that comprises at least one flap (34) that can occupy at least one so-called active position in which the at least one flap deflects—in a direction of a radial opening (32)—at least a portion of the flow that is able to assist the thrust and another at-rest position in which said flap (34) does not interfere with the flow that can assist the thrust, wherein a wall of the nacelle delimiting the duct in which the flow to be deflected flows comprises the at least one moving part that can occupy two positions, a first position in which it is interposed between the flow to be deflected and the flap (34) and another position in which it releases the flap (34) so as to allow said flap to change position and to move from the at-rest position to the active position,
each flap (34) comprises means for articulation (40) with a first pivoting axis (42) arranged at a first end called an upper end of the flap (34) and in an upper part of the nacelle and a second pivoting axis (44) arranged at a second end called a lower end of the flap (34) and in a lower part of the nacelle, and
said pivoting axes (42, 44) are essentially parallel to a vertical median axis (26) of the nacelle.

2. The aircraft nacelle according to claim 1, wherein the stationary part (28) comprises an extension (46) toward a rear in the upper part and an extension (48) toward a rear in the lower part, essentially symmetrical relative to the vertical median axis (26), whereby the extensions (46, 48) support the pivoting axes (42, 44).

3. The aircraft nacelle according to claim 1, wherein said at least one stationary part (28) and said at least one moving part (30) are configured to occupy a first position in which the at least one stationary part (28) and the at least one moving part (30) are contiguous, and a second position in which a radial opening (32) is made between the at least one stationary part (28) and the at least one moving part (30), and
said at least one moving part (30) comprises a recess (36) between the wall that corresponds to an outside surface (20) of the nacelle and the wall that corresponds to an inside surface (22) of the nacelle, whereby said recess (36) empties out at a field of the moving part (30) that can be in contact with the at least one stationary part and has dimensions and shapes that are suitable for housing the flap (34).

4. The aircraft nacelle according to claim 3, wherein an edge of said at least one moving part (30) that can be in contact with said at least one stationary part (28) comprises a concave shape that works with that of the flap (34).

5. The aircraft nacelle according to claim 3, wherein an edge of said at least one moving part (30) that is able to be in contact with said at least one stationary part (28) comprises a convex shape.

6. The aircraft nacelle according to claim 1, wherein the means for articulation (40) has at least one of said pivoting axes positioned very close to a center of an aerodynamic thrust of the flap.

7. The aircraft nacelle according to claim 1, wherein the at least one flap (34) has shapes that are complementary to the duct in which the flow to be deflected flows based on a fraction of the flow that is to be deflected.

8. The aircraft nacelle according to claim 2, wherein said at least one stationary part (28) and said at least one moving part (30) are configured to occupy a first position in which the at least one stationary part (28) and the at least one moving part (30) are contiguous, and a second position in which a radial opening (32) is made between the at least one stationary part (28) and the at least one moving part (30), and
said at least one moving part (30) comprises a recess (36) between the wall that corresponds to an outside surface (20) of the nacelle and the wall that corresponds to an inside surface (22) of the nacelle, whereby said recess (36) empties out at a field of the moving part (30) that can be in contact with the at least one stationary part and has dimensions and shapes that are suitable for housing the flap (34).

9. The aircraft nacelle according to claim 8, wherein an edge of said at least one moving part (30) that can be in contact with said at least one stationary part (28) comprises a concave shape that works with that of the flap (34).

10. The aircraft nacelle according to claim 8, wherein an edge of said at least one moving part (30) that is able to be in contact with said at least one stationary part (28) comprises a convex shape.

11. The aircraft nacelle according to claim 2, wherein the means for articulation (40) comprise at least one of said pivoting axes that is positioned very close to a center of an aerodynamic thrust of the flap.

12. The aircraft nacelle according to claim 2, wherein the flap (34) has shapes that are complementary to the duct in which the flow to be deflected flows based on a fraction of the flow that is to be deflected.

13. An aircraft nacelle in which a power plant is arranged, comprising:
a duct in which a flow that is able to assist thrust is able to flow;
at least one stationary part;
at least one moving part arranged behind the nacelle, the at least one moving part being configured to occupy a first position in which the at least one stationary part and the at least one moving part are contiguous, and the at least one moving part is configured to move translationally in a longitudinal direction so as to provide a radial opening after translational motion;
a device for reducing, canceling, or reversing the thrust that comprises at least one flap that can occupy at least one so-called active position in which the at least one flap deflects—in a direction of a radial opening—at least a portion of the flow that is able to assist the thrust and another at-rest position in which said flap does not interfere with the flow that can assist the thrust, wherein a wall of the nacelle delimiting the duct in which the flow to be deflected flows comprises the at least one moving part that can occupy two positions, a first position in which it is interposed between the flow to be deflected and the flap and another position in which it releases the flap so as to allow said flap to change position and to move from the at-rest position to the active position,
each flap comprises an articulator with a first pivoting axis arranged at a first end called an upper end of the flap and in an upper part of the nacelle and a second pivoting axis arranged at a second end called a lower end of the flap and in a lower part of the nacelle, and
said pivoting axes are essentially parallel to a vertical median axis of the nacelle.

14. The aircraft nacelle according to claim 13, wherein the stationary part comprises an extension toward a rear in the upper part and an extension toward a rear in the lower part, essentially symmetrical relative to the vertical median axis, whereby the extensions support the pivoting axes.

15. The aircraft nacelle according to claim 13, wherein said at least one stationary part and said at least one moving part are configured to occupy a first position in which the at least one stationary part and the at least one moving part are contiguous, and a second position in which a radial opening is made between the at least one stationary part and the at least one moving part, and
said at least one moving part comprises a recess between the wall that corresponds to an outside surface of the nacelle and the wall that corresponds to an inside surface of the nacelle, whereby said recess empties out at a field of the moving part that can be in contact with the at least one stationary part and has dimensions and shapes that are suitable for housing the flap.

16. The aircraft nacelle according to claim 15, wherein an edge of said at least one moving part that can be in contact with said at least one stationary part comprises a concave shape that works with that of the flap.

17. The aircraft nacelle according to claim 15, wherein an edge of said at least one moving part that is able to be in contact with said at least one stationary part comprises a convex shape.

18. The aircraft nacelle according to claim 13, wherein the means for articulation has at least one of said pivoting axes positioned very close to a center of an aerodynamic thrust of the flap.

19. The aircraft nacelle according to claim 13, wherein the at least one flap has shapes that are complementary to the duct in which the flow to be deflected flows based on a fraction of the flow that is to be deflected.

20. The aircraft nacelle according to claim 1, wherein said moving part is arranged behind the nacelle.

21. An aircraft nacelle in which a power plant is arranged, comprising:
a duct (16) in which a flow that is able to assist thrust is able to flow;
at least one stationary part (28);
at least one moving part (30) that can occupy a first position in which the at least one stationary part (28) and the at least one moving part (30) are contiguous, and the at least one moving part (3) is configured to move translationally in a longitudinal direction so as to provide a radial opening (32) after translational motion;
a device for reducing, canceling, or reversing the thrust that comprises at least one flap (34) that can occupy at least one so-called active position in which the at least one flap deflects—in a direction of a radial opening (32)—at least a portion of the flow that is able to assist the thrust and another at-rest position in which said flap (34) does not interfere with the flow that can assist the thrust, wherein a wall of the nacelle delimiting the duct in which the flow to be deflected flows comprises the at least one moving part that can occupy two positions, a first position in which it is interposed between the flow to be deflected and the flap (34) and another position in which it releases the flap (34) so as to allow said flap to change position and to move from the at-rest position to the active position, each flap (34) comprises means for articulation (40) with a first pivoting axis (42) arranged at a first end called an upper end of the flap (34) and in an upper part of the nacelle and a second pivoting axis (44) arranged at a second end called a lower end of the flap (34) and in a lower part of the nacelle, and said pivoting axes (42, 44) are essentially parallel to a vertical median axis (26) of the nacelle, wherein the stationary part (28) comprises an extension (46) toward a rear in the upper part and an extension (48) toward a rear in the lower part, essentially symmetrical relative to the vertical median axis (26), whereby the extensions (46, 48) support the pivoting axes (42, 44), at least one stationary part (28) and said at least one moving part (30) are configured to occupy a first position in which the at least one stationary part (28) and the at least one moving part (30) are contiguous, and a second position in which a radial opening (32) is made between the at least one stationary part (28) and the at least one moving part (30), and said at least one moving part (30) comprises a recess (36) between the wall that corresponds to an outside surface (20) of the nacelle and the wall that corresponds to an inside surface (22) of the nacelle, whereby said recess (36) empties out at a field of the moving part (30) that can be in contact with the at least one stationary part and has dimensions and shapes that are suitable for housing the flap (34).

* * * * *

UNITED STATES PATENT AND TRADEMARK OFFICE
CERTIFICATE OF CORRECTION

PATENT NO.       : 8,448,420 B2                                    Page 1 of 1
APPLICATION NO. : 12/525578
DATED            : May 28, 2013
INVENTOR(S)      : Bulin et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 957 days.

Signed and Sealed this
Eighth Day of September, 2015

Michelle K. Lee
*Director of the United States Patent and Trademark Office*